July 28, 1925.
C. D. CURRY
AUTOMOBILE MIRROR
Filed Jan. 5, 1921
1,547,794
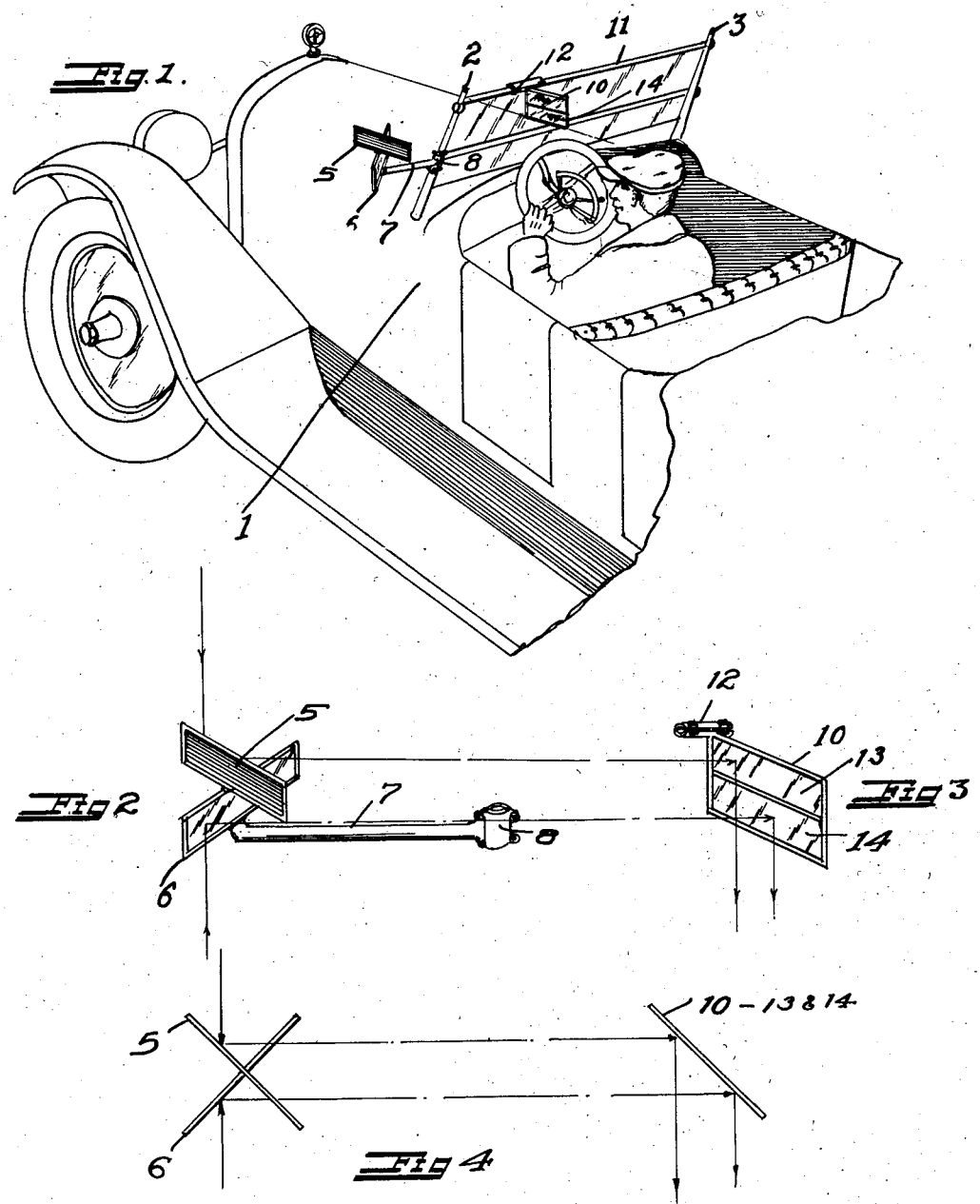
INVENTOR.
C. D. Curry
BY
Carlos P. Griffin
ATTORNEY.

Patented July 28, 1925.

1,547,794

UNITED STATES PATENT OFFICE.

CLIFFORD D. CURRY, OF MADERA, CALIFORNIA.

AUTOMOBILE MIRROR.

Application filed January 5, 1921. Serial No. 435,245.

*To all whom it may concern:*

Be it known that I, CLIFFORD D. CURRY, a citizen of the United States, residing at Madera, in the county of Madera, State of California, have invented a new and useful Automobile Mirror, of which the following is a specification in such full and clear terms as will enable those skilled in the art to construct and use the same.

This invention relates to an automobile mirror the object of which is to enable car drivers to observe cars approaching from both front and rear.

It will be understood by those familiar with the subject that if one driver is about to pass another going in the same direction, it is necessary for him to pull out far enough to the left to see whether there is a car approaching in the opposite direction and if there is, he must again fall back into the original position before he can pass the driver in front of him, unless the street is wide enough to permit three machines to pass abreast.

With the present invention there are two mirrors placed as far outside the car as is permissible, one with its silvered surface facing fowardly and the other with its silvered surface toward the rear. This will ordinarily place these mirrors about two to three feet laterally from the direct line of vision of the driver. If then another mirror is placed in such a position as to reflect the image of objects directly in front and in back of the car from the first two mirrors, and also in a position to be seen conveniently by the driver, he can see cars coming toward him on the road, the direct line of vision to which may be cut off by a car travelling in front of him as soon as the first two mirrors catch the reflection and while the car in front cuts off his direct view of the approaching car.

Other objects of the invention will appear as the description proceeds.

An embodiment of the invention is shown in the accompanying drawings in which the same reference numeral is applied to the same portion throughout, but I am aware that there may be modifications thereof.

Figure 1 is a perspective view of a portion of an automobile showing this mirror applied thereto.

Fig. 2 is a perspective view of the extended bracket carrying the outside mirrors.

Fig. 3 is a perspective view of the bracket for carrying the inner mirror.

Fig. 4 is a plan view of the three mirrors illustrating the reflecting action of the two outside mirrors and showing the possibility of seeing in the mirror within the car and have it out of the line of view of a person close to the mirror within the car.

The numeral 1 indicates the body of the automobile, 2 and 3 the wind shield supporting posts. The outside mirrors 5 and 6 are carried by a bracket arm 7, which has a clamping member 8 for securing it to the post 2. The two mirrors 5 and 6 are secured to the arm 7 substantially at right angles to each other and they extend in such a position that the rays of light striking them will be reflected in the mirrors carried by a frame 10.

This frame is secured to the top cross bar 11 of the wind shield by means of a clamp member 12.

The mirror frame 10 may be divided into two parts to hold mirrors 13 and 14. The angle of the two mirrors 5 and 6 and of the two mirrors 13 and 14 is so arranged that cars approaching the driver from the front will be seen in the mirror 13, while cars approaching the driver from the rear will be seen in the mirror 14.

It will of course be apparent that from the positions occupied by the mirrors 5 and 6 that it is possible for a driver with the aid of the mirrors 5 and 6 and the mirrors 13 and 14 to see the road both in front and behind him very much easier than if he attempted to lean out of the car and which is not possible in some instances.

What I claim is as follows, but various modifications may be made in the construction shown in the drawings and above particularly described form, within the purview of my invention.

A reflector sight device for motor vehicles comprising two mirrors secured to the vehicle one above the other and facing respectively forwardly and rearwardly of the vehicle, and a third mirror positioned to receive the reflected rays from said two mirrors separately upon its upper and its lower portions respectively and angularly arranged to reflect the received images in the line of vision of the driver of the vehicle.

In testimony whereof I have hereunto set my hand this 22 day of Dec. A. D. 1920.

CLIFFORD D. CURRY.